June 29, 1937.          H. G. ERICKSON          2,085,354
                        PLANTER MECHANISM
                       Filed Oct. 1, 1935          2 Sheets-Sheet 1
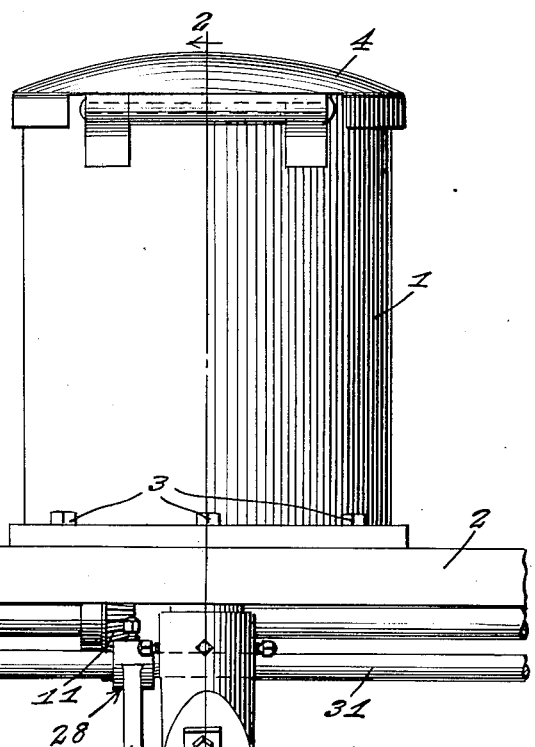
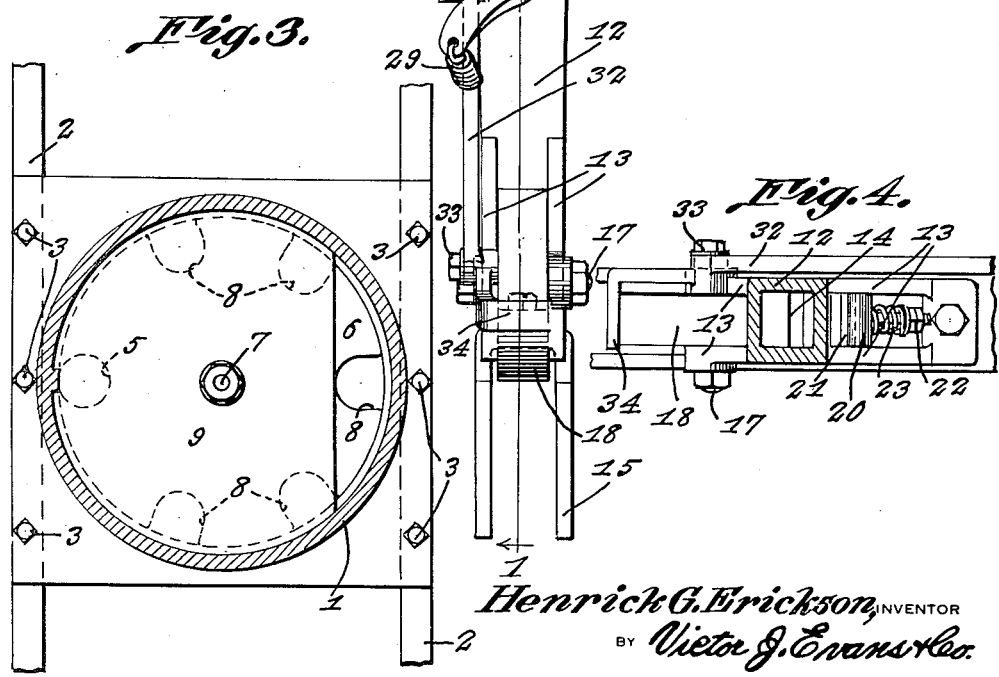
Henrich G. Erickson, INVENTOR
BY Victor J. Evans & Co.
ATTORNEY

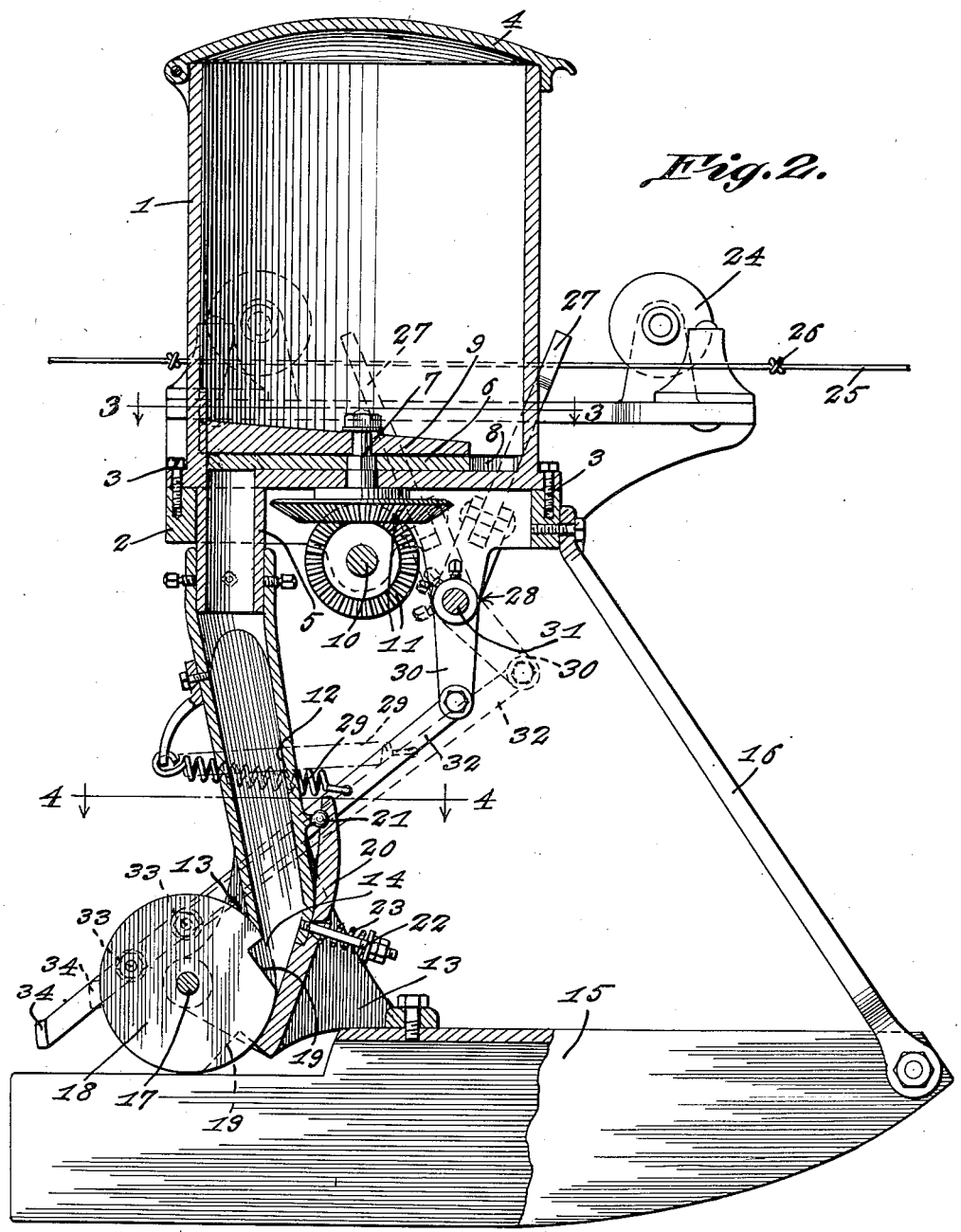

Patented June 29, 1937

2,085,354

UNITED STATES PATENT OFFICE 2,085,354

PLANTER MECHANISM

Henrick G. Erickson, Clear Lake, Iowa

Application October 1, 1935, Serial No. 43,087

1 Claim. (Cl. 111—34)

This invention relates to seed dropping mechanism for planters of the check row type operating under the control of the usual check row wire and has for the primary object the provision of a device of this character which will be efficient and accurate in operation and will be self-cleaning of any foreign matter which may have a tendency to interfere with or clog the seed depositing element or the seed conducting tube leading thereto, said tube affording a support for the seed operating element and shoe.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a fragmentary rear elevation illustrating a seed dropping mechanism constructed in accordance with my invention.

Figure 2 is a sectional view taken on the line 2—2 of Figure 1.

Figure 3 is a horizontal sectional view taken on the line 3—3 of Figure 2.

Figure 4 is a detail sectional view taken on the line 4—4 of Figure 2.

Referring in detail to the drawings, the numeral 1 indicates a seed hopper which may be readily adapted to a planter frame 2, as shown in Figures 1 and 2 of the drawings, being secured to said frame by bolts or like fasteners 3. A hinged cover 4 is provided for the hopper and the bottom thereof is provided with a discharge neck 5. A metering disc 6 secured to a shaft 7 is journaled to the bottom of the hopper. The metering disc 6 has openings 8 adapted to move into and out of registration with the discharge neck 5 for the purpose of depositing a number of seeds in the discharge neck. Partially overlying the metering disc 6 is a guard plate 9, the latter being held in place by the shaft 7 extending therethrough. The upper face of the guard plate 9 slopes for the purpose of directing seed onto the metering disc and into the opening thereof. The bottom of the hopper closes the opening 8 and prevents passage of seed therethrough until said opening 8 aligns with the discharge neck 5. A shaft 10 is journaled to the frame 2 of the planter and is geared to the shaft 7, as shown at 11. Any suitable means is employed for connecting the shaft 10 to one of the traction wheels of the planter so as to impart rotation to the metering disc 6 by the movement of the planter.

A seed conducting tube 12 is detachably secured to the neck 5 and depends therefrom. The lower end of the tube 12 is in the form of a bracket 13 extending forwardly and rearwardly of the discharge opening 14 of the tube. A shoe 15 is secured to the forward portion of the bracket 13 and extends forwardly and rearwardly of the tube 12. The forward end of the shoe 15 is connected to the frame of the planter by a brace 16. The rear portion of the bracket 13 forms a journal for a shaft 17 to which is secured a disclike seed depositing element 18 provided with a seed pocket 19 adapted to move into and out of communication with the discharge opening 14 of the tube 12 by the oscillation of said seed depositing element 18.

A guard plate or shoe 20 is pivoted to the tube 12, as shown at 21, and is also yieldably connected to the shoe, as shown at 22. The yieldable connection 22 is in the form of a bolt secured to the tube 12 and extending through an aperture in the guard plate or shoe 20 and has threaded thereon nuts. A spring 23 is mounted on the bolt 22 between the nuts and the shoe or guard plate 20 and the latter projects below the discharge opening 14 of the tube in advance of the seed depositing element 18 and is slightly spaced from the periphery thereof. The guard plate or shoe 20 cooperates with the discharge end of the tube 12 in closing the pocket 19 of the seed depositing element 18 until the latter turns or moves beyond the lower end of the guard plate or shoe whence the pocket becomes open permitting the seeds therein to be deposited into the furrow formed by the shoe 15. Should foreign matter pass through the tube 12 into the pocket 19 and have a tendency to clog or interfere with the operation of the seed depositing element 18, the shoe or guard plate 20 will yield and permit such foreign matter to pass from the pocket when the depositing element 18 turns downwardly from the position shown in full lines in Figure 2 to the position shown in dotted lines in said figure.

Secured to the planter frame at one side of the hopper is a conventional type of wire follower or guide 24 and Figure 2 shows the guide operating in conjunction with a check row wire 25, the latter having knots 26 for the purpose of operating a forked member 27 of an operating mechanism 28. Said mechanism is for the purpose of imparting a turning movement to the seed depositing element 18 in one direction when the forked element 27 engages with a knot of the wire 25. The seed depositing element 18 is returned to full line position in Figure 1 or turned in an opposite direction from that provided by the mechanism 28 by a coil spring 29.

The mechanism 28 consists of a crank 30 journaled on a shaft 31 suitably supported to the frame of the planter and one end of the crank has the forked element 27 connected thereto, while the opposite end of the crank 30 has a link 32 pivoted thereto. The link 32 is pivoted eccentrically to the seed depositing element 18, as shown at 33. An extension 34 is formed on the pivoted end 33 of the link 32 and is adapted to act as a stop for limiting the movement of the seed depositing element 18 beyond the dotted line position shown in Figure 2 by the extension contacting the periphery of the seed depositing element this being indicated by dotted lines in Figure 2.

Having described the invention, I claim:

A seed dropping mechanism comprising a hopper having an outlet, a tube connected in said outlet and having a discharge end, a bracket formed on the discharge end of the tube, a disclike seed depositing element journaled to the bracket and having a pocket, a guard pivotally and yieldably connected to the tube and associated with the discharge end thereof and with the seed depositing element, a link eccentrically pivoted to the seed depositing element and having one end bent to form a stop adapted to contact the periphery of the seed depositing element for limiting the movement of said seed depositing element in one direction, spring means connected to said link for moving the seed depositing element in one direction, and a check row wire operated mechanism connected to the link for moving the seed depositing element in an opposite direction.

HENRICK G. ERICKSON.